US008248453B2

(12) United States Patent
Lee et al.

(10) Patent No.: US 8,248,453 B2
(45) Date of Patent: Aug. 21, 2012

(54) CALL CONTROL SYSTEM AND METHOD FOR MOBILE COMMUNICATION

(75) Inventors: Jong Phil Lee, Daegu (KR); Woo Jin Chang, Gumi-si (KR)

(73) Assignee: Samsung Electronics Co., Ltd., Samsung-ro, Yeongton-gu, Suwon-si, Gyeonggi-do (KR)

( * ) Notice: Subject to any disclaimer, the term of this patent is extended or adjusted under 35 U.S.C. 154(b) by 1341 days.

(21) Appl. No.: 11/975,501

(22) Filed: Oct. 19, 2007

(65) Prior Publication Data

US 2008/0100692 A1    May 1, 2008

(30) Foreign Application Priority Data

Oct. 31, 2006    (KR) .......................... 10-2006-0106058

(51) Int. Cl.
*H04N 7/14*    (2006.01)

(52) U.S. Cl. ................................... 348/14.08; 348/14.01

(58) Field of Classification Search ............... 348/14.01, 348/14.02, 14.03, 14.04–14.16; 379/201.01, 379/202.01; 370/260–271
See application file for complete search history.

(56) References Cited

U.S. PATENT DOCUMENTS 7,359,373 B2 *    4/2008    Kuusinen et al. ............. 370/352
7,567,269 B2 *    7/2009    Sakano et al. ............. 348/14.01

\* cited by examiner

*Primary Examiner* — Brian Ensey
(74) *Attorney, Agent, or Firm* — Cha & Reiter, LLC

(57) ABSTRACT

A call control system and method for mobile video telephony that enables an automatic call setup between a mobile video telephony terminal and a mobile audio-dedicated terminal is disclosed. A call control method for communication between mobile terminals having different capabilities includes receiving, at a called party terminal, a call setup message, transmitting a disconnection message to a calling party terminal in response to the video call setup message and performing a call setup procedure triggered by the called part terminal.

25 Claims, 9 Drawing Sheets

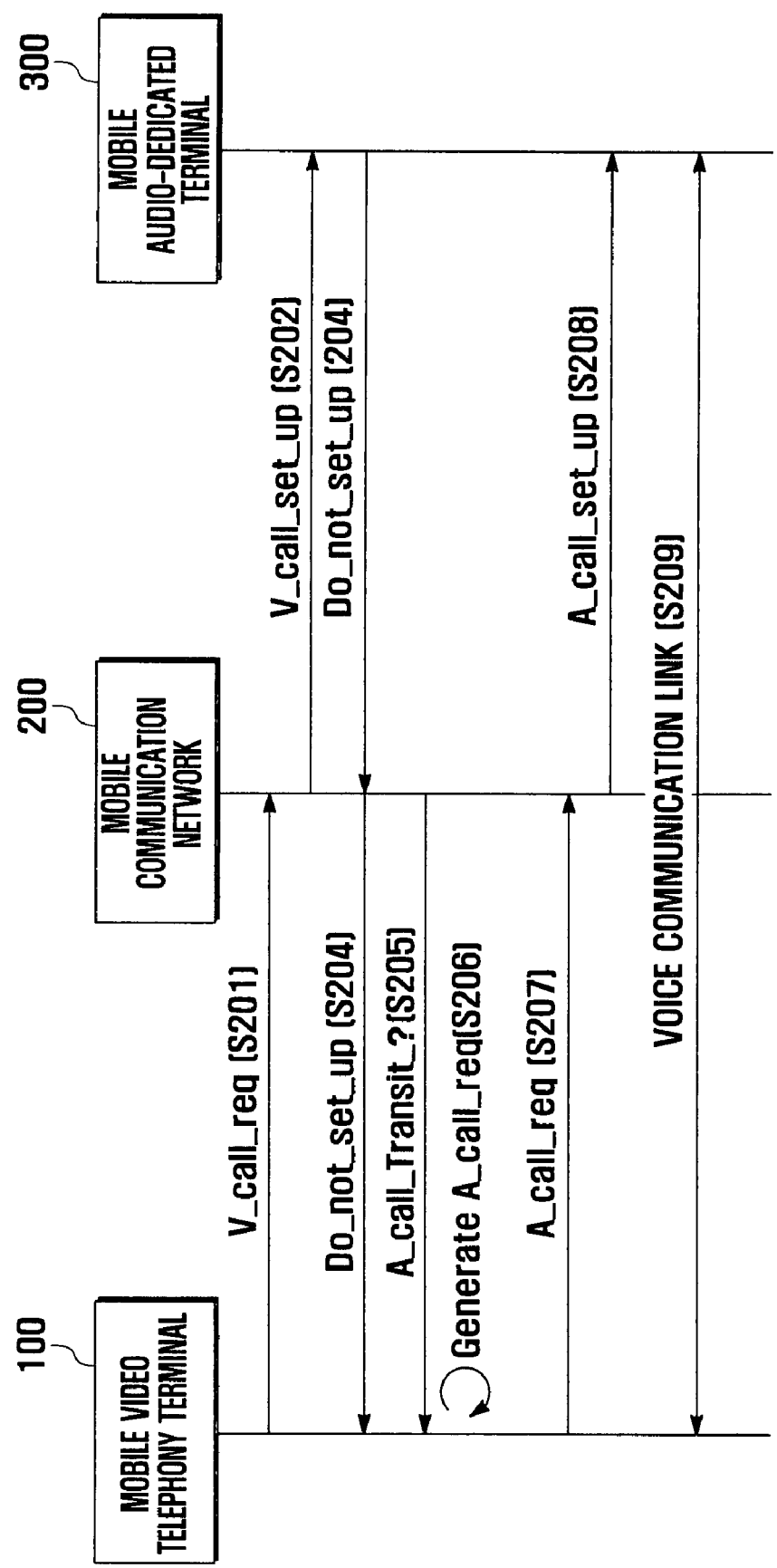

CALL CONTROL SYSTEM AND METHOD FOR MOBILE COMMUNICATION

CLAIM OF PRIORITY

This application claims, pursuant to 35 U.S.C. §119(a), priority to and the benefit of the earlier filing date of a Korean patent application entitled "CALL CONTROL SYSTEM AND METHOD FOR MOBILE COMMUNICATION," filed in the Korean Intellectual Property Office on Oct. 31, 2006 and assigned Serial No. 2006-0106058, the contents of which are incorporated herein by reference.

BACKGROUND OF THE INVENTION

1. Field of the Invention

The present invention relates to mobile video telephony and, in particular, to a call control system and method for mobile video telephony that enable an automatic call setup between a mobile video telephony terminal and a mobile audio-dedicated terminal.

2. Description of the Related Art

Video telephony is a service that enables participants to communicate while viewing each other in real time. Video telephony can be implemented with a switch-based circuit switching network or a packet switched All-IP network.

In order to implement video telephony over a mobile IP, H.323 and H.324M standards developed by the International Telecommunications Union (ITU) are recommended.

H.323 is a protocol designed to provide teleconferencing with voice, video, and data capabilities on packet switching networks, and H.324 is a protocol for sharing voice, video and data over an analog telephone line. Meanwhile, H.324M refers to a "mobile" extension of H.324 protocol developed by the ITU.

H.324M uses H.261 and H.263 as video codecs and G.723.1 as an audio codec. H.261 is a digital video coding standard designed for compressing and coding video data, and H263 and MPEG-4 are enhanced video codecs for compressed encoding for video conferencing. G.723.1 is an audio codec providing 8 Kbps codec bit rate.

The Third Generation Partnership Project has adopted H.324M as a standard for conversational video-telephony over 3G, which is named 3G-324M. 3G-324M differs from H.324M in that it uses an Adaptive Multi-Rate (AMR) codec as the basic voice codec, and G.723.1 is optional.

In addition, H.324 uses H.223 protocol for multiplexing voice, video, and data; and H.245 protocol as a control protocol for selecting a voice codec and assigning channels for a point-to-point or a point-to-multipoint connection.

In the case of a video communication service using H.324M, two terminals establish a call connection through a call establishment procedure. Between the two terminals, an audiovisual link is established.

However, the conventional audiovisual communication service has a limitation in establishing a communication link between a video communication-enabled terminal and an audio-dedicated terminal. If a called party terminal does not support the audiovisual communication function, a communication channel cannot be established. In this case, the calling party terminal receives a message informing the calling party that the called party terminal cannot respond to the audiovisual communication call. That is, the calling party terminal does not know the capacity of the called party terminal before the call is initiated, and hence it periodically attempts audiovisual communication with the called party terminal without recognizing that the called party terminal is an audio-dedicated terminal that does not support the audiovisual communication service.

SUMMARY OF THE INVENTION

The present invention provides a call control system and method for mobile communication that enable an automatic call setup between mobile terminals having different capabilities.

In accordance with an aspect of the present invention, a call control method for a communication between mobile terminals having different capabilities is disclosed. The call control method includes receiving, at a called party terminal, a call setup message, transmitting a disconnection message to a calling party terminal in response to the video call setup message and performing a call setup procedure triggered by the called party terminal.

In accordance with another aspect of the present invention, a call control method for a mobile communication system including a video telephony terminal, an audio-dedicated terminal, and a mobile communication network supporting communication between the terminals is disclosed. The call control method includes transmitting, at the video telephony terminal, a video call request message to the mobile communication network, transmitting, at the mobile communication network, a video call setup message to the audio-dedicated terminal in response to the video call request message, transmitting, at the audio-dedicated terminal, a disconnection message to the video telephony terminal through the mobile communication network and transmitting, at the audio-dedicated terminal, an audio call request message to the mobile communication network.

In accordance with another aspect of the present invention, a call control system for a mobile terminal is disclosed. The call control system includes a radio frequency unit which receives video call setup message, transmits a disconnection message in response to the video call setup message, and then transmits an audio call request message to a calling party terminal, an audio processing unit for processing an audio signal generated during a communication session and a control unit for controlling automatic transmission of the disconnection message and the audio call request message.

In accordance with another aspect of the present invention, a call control system includes an audio visual telephony terminal that transmits a video call request message, an audio-dedicated terminal that transmits a disconnection message to the audio visual telephony terminal in response to the video call request message and a mobile communication network for supporting communication between the audio visual telephony terminal and the audio-dedicated terminal.

In accordance with another aspect of the present invention, a call control method for a mobile terminal is disclosed. The call control method includes transmitting a video call request message, receiving an audiovisual communication unavailable message in response to the video call request message, and transmitting an audio call request message in response to the audiovisual communication unavailable message.

In accordance with another aspect of the present invention a call control method of a mobile communication system is disclosed. The mobile communication system includes a mobile communication network supporting communication between a video telephony terminal and an audio-dedicated terminal. The call control method includes transmitting, at the video telephony terminal, video call request message to the mobile communication network, transmitting, at the mobile communication network, video call setup message to the audio-dedicated terminal in response to the video call request message, transmitting, at the audio-dedicated terminal, a disconnection message to the video telephony terminal in response to the video call setup message through the mobile communication network, transmitting, at the video telephony terminal, an audio call request message to the mobile communication network and transmitting, at the mobile communication network, an audio call setup message to the audio-dedicated terminal in response to the audio call request message.

BRIEF DESCRIPTION OF THE DRAWINGS

The above features and advantages of the present invention will be more apparent from the following detailed description in conjunction with the accompanying drawings, in which:

FIG. 9 is a message flow diagram illustrating message flows in a call control system in association with the call control method of FIG. 8.

DETAILED DESCRIPTION OF THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Certain terminologies are used in the following description for convenience and reference only and are not to be considered limiting. In the following detailed description, only exemplary embodiments of the invention have been shown and described, simply by way of illustration of the best mode contemplated by the inventors of carrying out the invention. As will be realized, the invention is capable of modification in various obvious respects, all without departing from the scope and intent of the invention. Accordingly, the drawings and description are to be regarded as illustrative in nature and not restrictive.

In the following exemplary embodiments, at least two kinds of setup message are used for indicating a video call setup and an audio call setup.

The mobile terminal can be any kind of terminal capable of communication with a mobile communication system, such as a Personal Digital Assistant (PDA), laptop computer, Smartphone, $3^{rd}$ generation standard mobile terminal, Code Division Multiple Access (CDMA) terminal, Global System for Mobile communication (GSM) terminal, Global Packet Radio Services (GPRS) terminal, Wireless Local Area Network (WLAN) terminal, Wireless Broadband (WiBro) Terminal, and High Speed Downlink Packet Access (HSDPA) terminal.

A mobile terminal supporting the video telephony service is referred-to as a mobile video telephony terminal and a mobile terminal supporting only voice communication is referred-to as a mobile audio-dedicated terminal.

Figure 1:
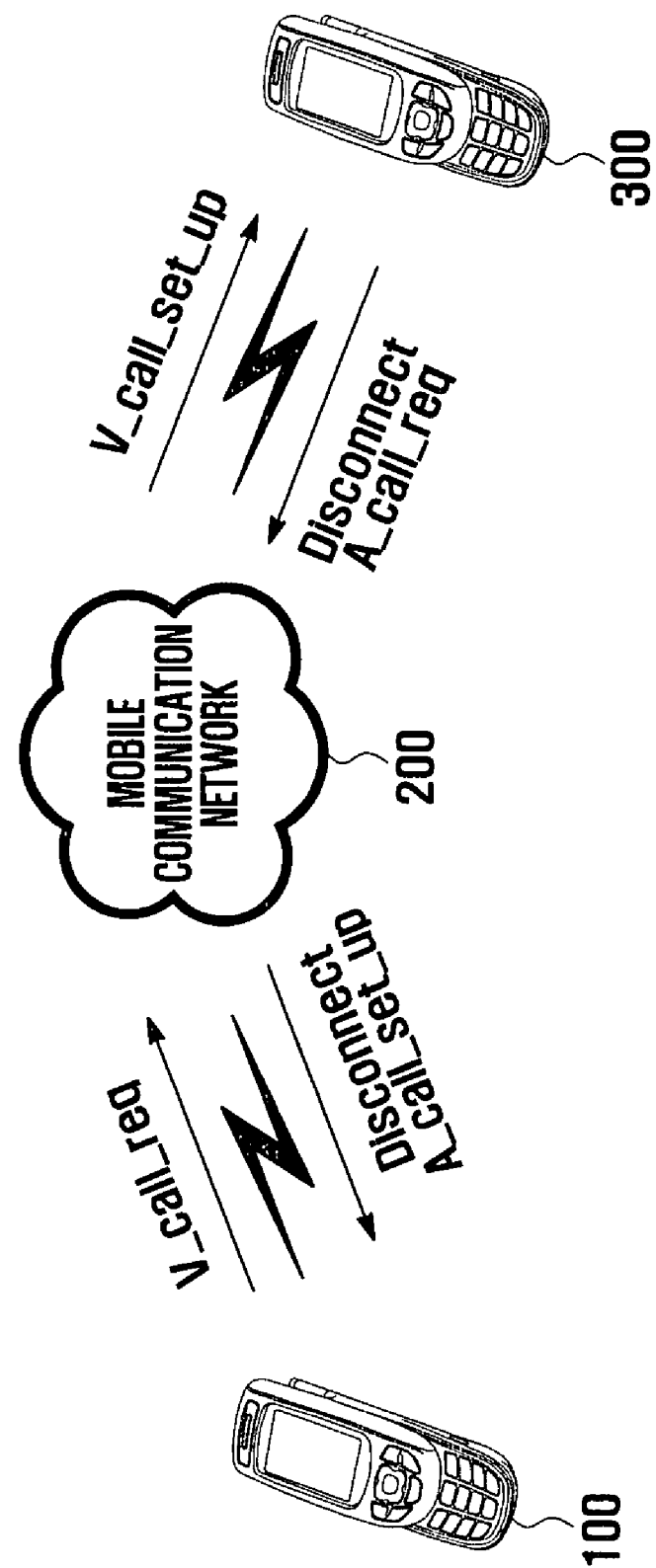
FIG. 1 is a schematic diagram illustrating a call control system according to an exemplary embodiment of the present invention.

FIG. 1 is a schematic diagram illustrating a call control system according to an exemplary embodiment of the present invention.

Referring to FIG. 1, the call control system includes a mobile video telephony terminal 100, a mobile audio-dedicated terminal 300, and a mobile communication network 200. In the call control system, the video telephony terminal 100 transmits a video call request message (V_call_req) to the mobile communication network 200. In response to the V_call_req message, the mobile communication network 200 transmits a video call setup message (V_call_set_up) to the mobile audio-dedicated terminal 300. Upon receiving the V_call_set_up message, the mobile audio-dedicated terminal 300 sequentially transmits a disconnection message (Disconnect) and an audio call request message (A_call_req) to the mobile communication network 200. When the Disconnect and A_call_req messages are received, the mobile communication network 200 transmits the Disconnect and an audio call setup request message (A_call_set_up) to the video telephony terminal 100 such that an audio call link is established between the mobile video telephony terminal 100 and the mobile audio-dedicated terminal 300.

Figure 2:
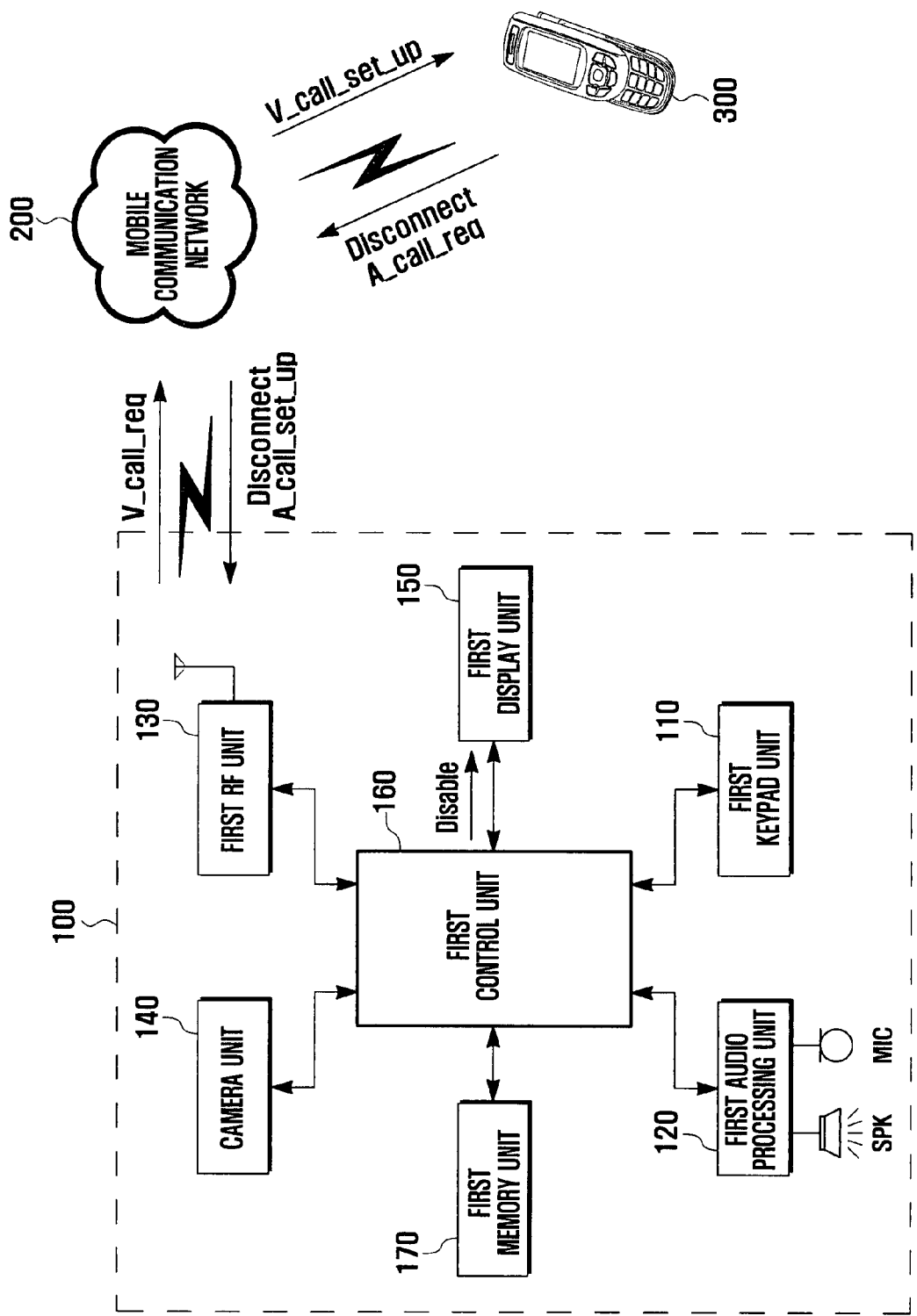
FIG. 2 is a block diagram illustrating a configuration of the mobile video telephony terminal of FIG. 1.

FIG. 2 is a block diagram illustrating a configuration of the mobile video telephony terminal 100 of FIG. 1.

Referring to FIG. 2, the mobile video telephony terminal 100 includes a first audio processing unit 120, a camera unit 140, a first keypad unit 110, a first display unit 150, a first memory unit 170, a first radio frequency (RF) unit 130, and a first control unit 160.

The first audio processing unit 120 is responsible for processing an audio signal received through the first RF unit 130 to output the audio signal as an audible sound wave through a speaker (SPK), and for processing an audio signal input through a microphone (MIC) to output as audio data to the first control unit 160. The audio data are synchronized with video data input through the camera unit 140 and then transmitted as a transmission signal when the mobile video telephony terminal 100 operates in an audiovisual communication mode.

The camera unit 140 takes a picture and outputs the picture as a video signal to the first control unit 160. The video signal can be stored in the form of a file, temporarily or semi-permanently, in the first memory unit 170. The camera unit 140 can take a still picture and a moving picture. In the audiovisual communication mode, the camera unit 140 can take a video stream such that the video stream is transmitted through the first RF unit 130 in real time. At this time, the transmission and reception video streams can be stored in the first memory unit 170 in the form of a motion picture file. The motion picture file can be temporarily stored and then removed in consideration of the capacity of the first memory unit 170.

The first keypad unit 110 is provided with a plurality of alphanumeric keys for furnishing user input data and various function keys for executing specific operations. The function keys may include navigation keys, volume keys, and shortcut keys. The first keypad unit 110 generates a key signal associated with a user configuration or a function control and outputs the key signal to the first control unit 160.

The first display unit 150 presents various menu screens associated with applications installed in the mobile video telephony terminal 100 and information input by the user or read from the first memory unit 170. Particularly, the first display unit 150 presents a motion picture taken by the camera unit 140 or received from another terminal, in an audiovisual communication session and communicates state information. That is, the first display unit 150 displays information generated in response to user key input during an audiovisual communication link establishment procedure and announcement message for notifying whether the audiovisual communication link is successfully established or not. The announcement message can be displayed in the form of a popup window. The announcement message can be displayed with different content in accordance with a reason of the audiovisual communication link establishment failure. For example, an announcement message "out of service area" may be displayed when the mobile video telephony terminal 100 is located in a blind area, or "audiovisual communication service is not available" when a called party terminal is located in an area where the audiovisual communication service is not supported, or "non-video telephony terminal" when the called party terminal does not support an audiovisual communication. The first display unit 150 can be implemented with a liquid crystal display (LCD) operating with a touchscreen. In this case, the first display unit 150 can be an input device.

The first memory unit 170 stores applications associated with the video telephony and video data generated while executing the video telephony applications. The first memory unit 170 is also responsible for buffering the audio and video stream to and from the called party terminal. The memory unit may include a program region and a data region.

The program region stores an operating system (OS) for controlling general operation of the mobile video telephony terminal 100 and applications associated with various supplemental functions such as camera, audio and video file playback and audiovisual communication functions. The applications are executed by a user command under the control of the first control unit 160.

The data region stores application data generated by the applications, such as still and motion pictures, phone book data, audio files, and user information. The data region also can store the video stream transmitted to or received from the counterparty terminal temporarily or semi-permanently according to a user's selection.

The first RF unit 130 is responsible for processing control signals associated with an audiovisual communication link establishment and video and audio signals during an audiovisual communication session, to be transmitted to or received from a counterparty terminal. The first RF unit 130 includes an RF transmitter for up-converting and amplifying a baseband signal to be transmitted and an RF receiver capable of low noise amplifying and down-converting a received radio frequency signal.

The first control unit 160 controls generation operations of the mobile video telephony terminal 100 and cooperative signaling operations among the internal units. The first control unit 160 can be implemented with a modem and a codec for compressing/decompressing the audio and video data.

The first control unit 160 controls the video telephony function and includes a multiplexer/demultiplexer for multiplexing video, audio, and control signals, and outputting a multiplexed signal to the first RF unit 130. The control signal includes a synchronization signal of the video and audio signals.

The first control unit 160 controls exchange of control signals for establishing an audiovisual communication link and displaying information regarding the communication link setup status on the first display unit 150. The first control unit 160 transmits V_call_req message to the mobile communication network 200 through the first RF unit 130 and receives a Disconnect signal or Disconnect message from the mobile communication network 200 when it is not possible to establish an audiovisual communication link with the called party terminal. At this time, the first control unit 160 controls the first display unit 150 to display an announcement message of "audiovisual communication service is not available," for example, in the form of a popup window.

Figure 3:
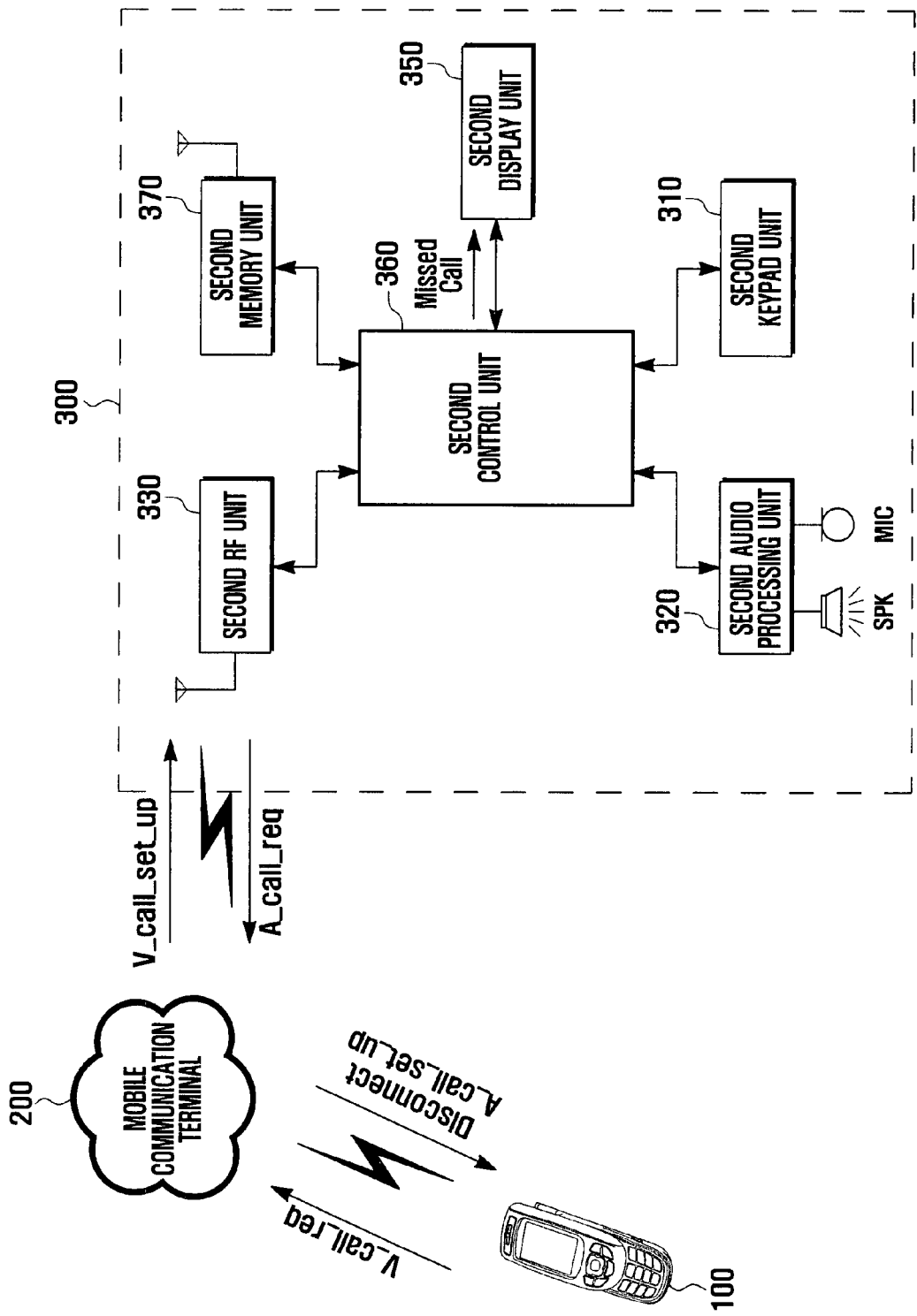
FIG. 3 is a block diagram illustrating a configuration of the mobile audio-dedicated terminal of FIG. 1.

FIG. 3 is a block diagram illustrating a configuration of the mobile audio-dedicated terminal 300 of FIG. 1.

Referring to FIG. 3, the mobile audio-dedicated terminal 300 includes an audio processing unit 320, a keypad unit 310, a display unit 350, a memory unit 370, an RF unit 330, and a control unit 360.

Detailed descriptions on the structures and functions identical with those of the mobile video telephony terminal 100 of FIG. 2 are omitted hereinafter. Thus, the structures and functions of the audio processing unit 320, memory unit 370, and RF unit 330 are similar to those of the mobile video telephony terminal 100 and need not be described in detail.

The display unit 350 displays various menu screens of voice-communication applications and information input by the user or read from the memory unit 370. Particularly, the display unit 350 is controlled to display an announcement notifying the reception of a video call request message (V_call_req) and the unavailability of the audiovisual communication (for example, "missed call"). After the video call request is rejected, the mobile audio-dedicated terminal 300 attempts to establish a voice communication link. In this case, the display unit 370 is controlled to display information thereto on the mobile video telephony terminal 100, e.g. a phone number of the mobile video telephony terminal 100, or a preset outgoing call image. After the voice communication link is established, the display unit 370 is controlled to display a preset on-line image. The display unit 370 can be implemented with an LCD with a touchscreen. In this case, the display unit 370 can also be an input device.

The control unit 360 controls generation operations of the mobile audio-dedicated terminal 300 and cooperative signaling operations among the internal units. The control unit 360 can be implemented with a modem and a codec for voice signals.

Figure 4:
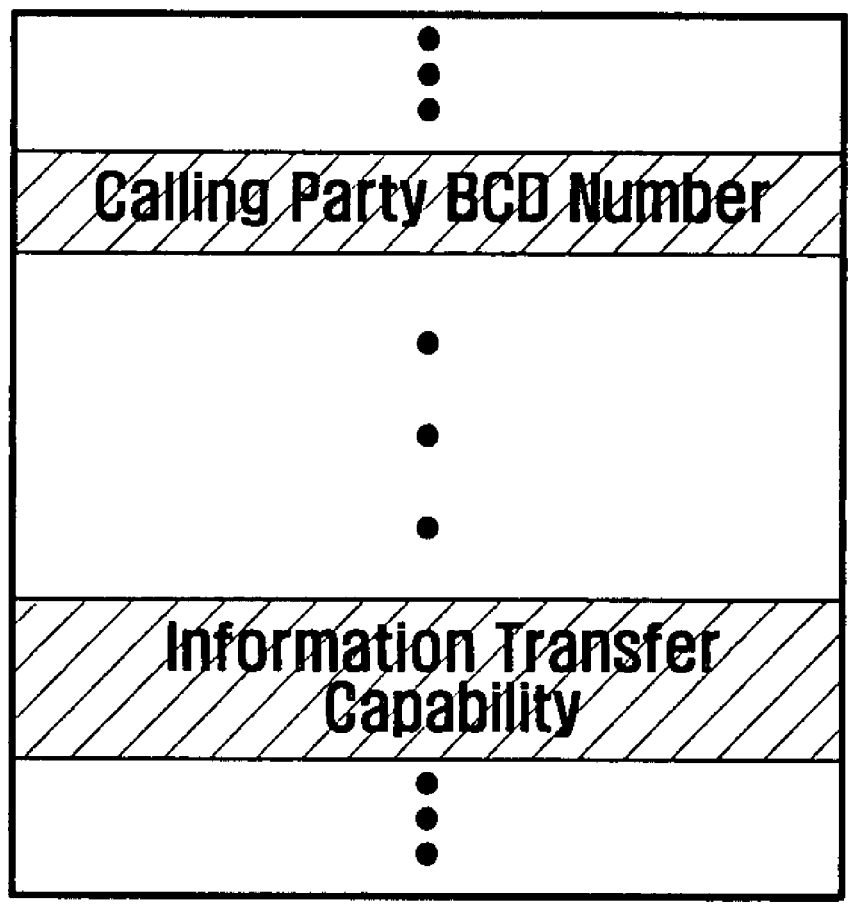
FIG. 4 is a diagram illustrating a message format of a video call setup message according to an exemplary embodiment of the present invention.

The control unit 360 generates and transmits a disconnection message (Disconnect) in response to the V_call_set_up message transmitted by the mobile communication network 200. The control unit 360 extracts a phone number of the calling party terminal, i.e. the mobile video telephony terminal 100, from V_call_set_up message, and attempts to establish a voice communication link to the phone number. FIG. 4 is a diagram illustrating an exemplary message format of a V_call_set_up message according to another exemplary embodiment of the present invention. As shown in FIG. 4, V_call_set_up message includes a calling party binary coded decimal (BCD) number representing a phone number. In more detail, if V_call_set_up message for an audiovisual communication is received, the mobile audio-dedicated terminal 300 transmits a Disconnect signal to the mobile video telephony terminal 100 through the mobile communication network 200 so as to terminate the audiovisual communication establishment procedure. Next, the mobile audio-dedicated terminal 300 transmits A_call_req to the mobile communication network 200 and thus the mobile communication network 200 transmits A_call_set_up message to the calling party terminal, i.e. the mobile video telephony terminal 100, with reference to the phone number contained in V_call_set_up message.

A call type can be recognized by referring to an Information Transfer Capability field of V_call_set_up message. The Information Transfer Capability field of the V_call_set_up message contains a value indicating the call type, i.e. an audio call, a data call, or a video call.

The control unit 360 obtains the phone number of the calling party terminal, i.e. the mobile video telephony terminal 100, from the V_call_set_up message. The phone number of the mobile video telephony terminal 100 is contained in the Calling Party BCD Number field of V_call_set_up message.

The control unit 360 controls the display unit 350 to display a missing call announcement when V_call_set_up message from the mobile communication network 200 is received.

Although the mobile video telephony terminal and the mobile audio-dedicated terminal are depicted as shown in FIGS. 2 and 3, respectively, their configurations can be modified by adding other functional modules such as a digital broadcast receiver.

A call control operation of the above-structured call control system is described hereinafter with reference to the accompanying drawings.

Figure 5:
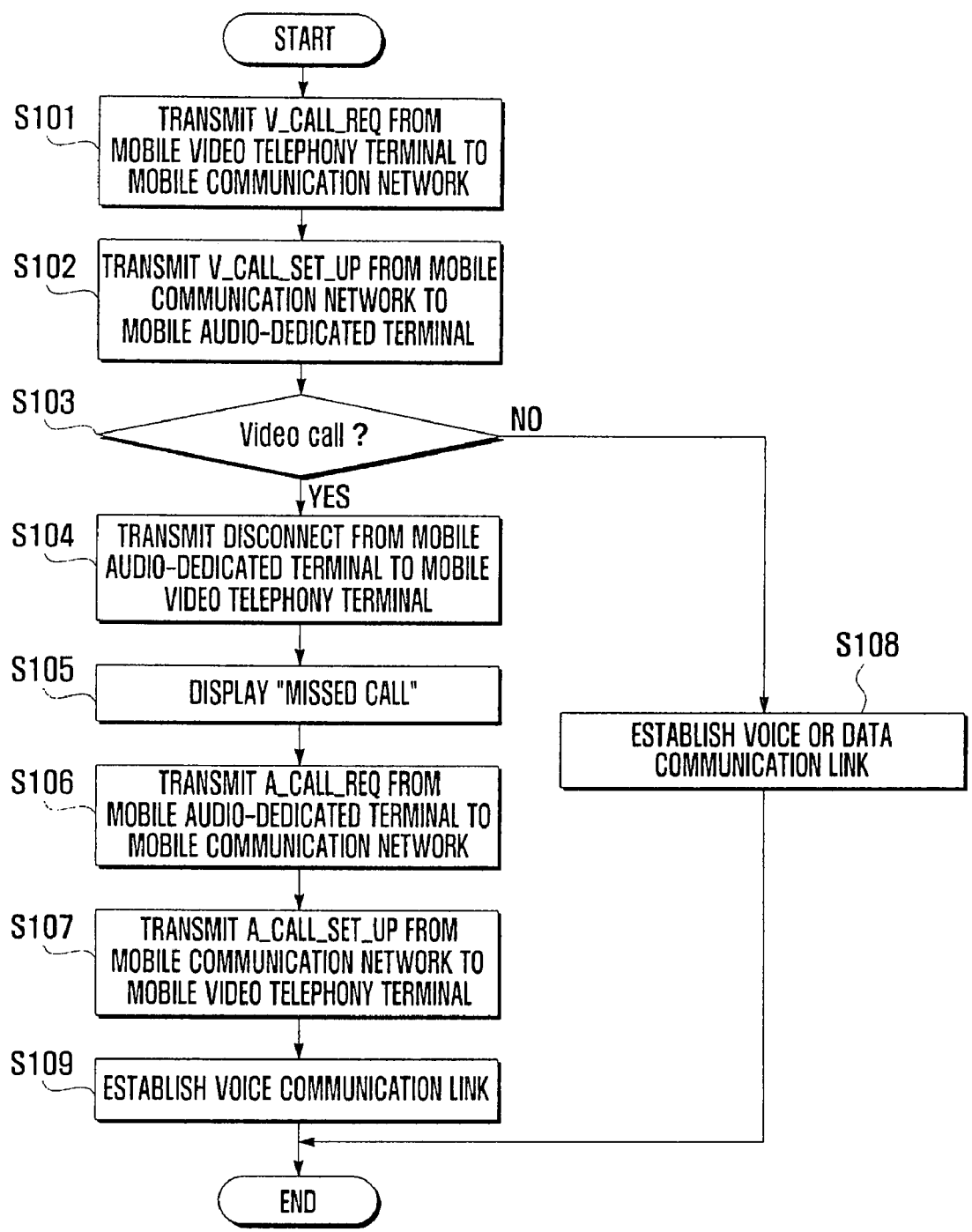
FIG. 5 is a flowchart illustrating a call control method for mobile video telephony according to an exemplary embodiment of the present invention.
Figure 6:
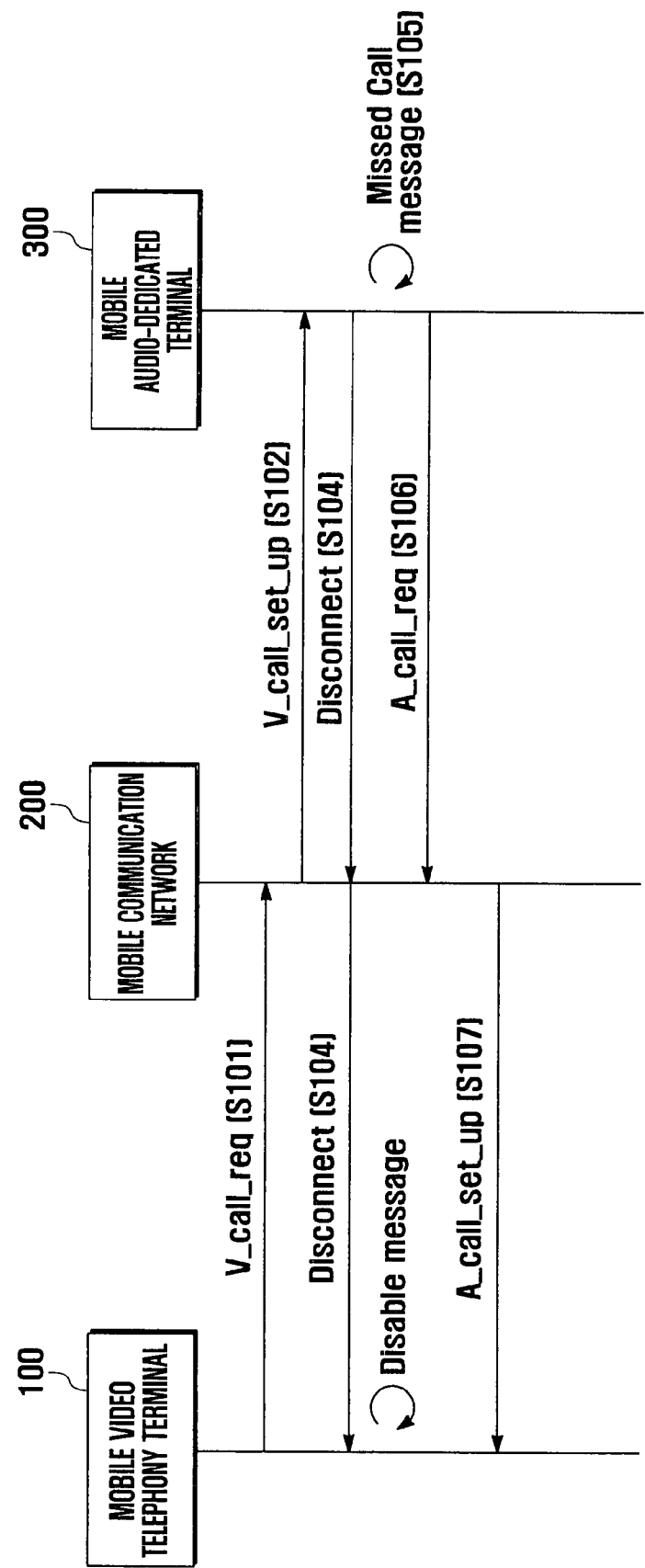
FIG. 6 is a message flow diagram illustrating message flows in the call control system in association with the call control method of FIG. 5.

FIG. 5 is a flowchart illustrating a call control method for a mobile video telephony according to another exemplary embodiment of the present invention, and FIG. 6 is a message flow diagram illustrating message flows in a call control system in association with the call control method of FIG. 5.

Referring to FIGS. 5 and 6, the mobile video telephony terminal 100 transmits a video call request message (V_call_req) to the mobile communication network 200 (S101). Upon receiving the V_call_req message, the mobile communication network 200 transmits a video call setup message (V_call_set_up) corresponding to the V_call_req message to the mobile audio-dedicated terminal 300 (S102).

The V_call_set_up message includes an Information Transfer Capability field set to "video call", a calling party phone number for the mobile video telephony terminal 100, and a called party phone number for the mobile audio-dedicated terminal 300.

When the V_call_set_up message is received, the mobile audio-dedicated terminal 300 checks the V_call_set_up message to determine whether the call setup request is for an audiovisual communication (S103).

The mobile audio-dedicated terminal 300 can recognize a requested call type with a value of the Information Transfer Capability field of the V_call_set_up message. The call type can be one of an audio call, a data call, and a video call.

If the V_call_set_up message includes video call identifier, the mobile audio-dedicated terminal 300 rejects the V_call_set_up message and transmits a disconnection message (Disconnect) to the mobile video telephony terminal 100 through the mobile communication network 200 (S104). The mobile audio-dedicated terminal 300 may then display an announcement message, e.g. "Missed Call", on a display screen (S105).

The mobile video telephony terminal 100 can be configured to display an announcement message, e.g. "audiovisual communication disabled", on its display screen when the Disconnect message or signal is received.

At step S105, the mobile audio-dedicated terminal 300 can also be configured to record the missed call in a log file without displaying a missed call announcement message.

Next, the mobile audio-dedicated terminal 300 transmits an audio call request message (A_call_req) to the mobile communication network 200 (S106). The A_call_req message is transmitted together with the phone number of the mobile video telephony terminal 100 obtained from the V_call_set_up message.

Upon receiving the A_call_req message, the mobile communication network 200 generates and transmits an audio call setup message (A_call_set_up) to the mobile video telephony terminal 100 (S107). With the acceptance of audio communication by the mobile video telephony terminal 100, a voice communication link is established between the mobile video telephony terminal 100 and the mobile audio-dedicated terminal (109).

The phone number of the mobile video telephony terminal 100 is obtained from the Calling Party BCD Number field of the V_call_set_up message.

At step S103, if the call setup request is not for an audiovisual communication, i.e. the Information Transfer Capability field of the V_call_set_up message indicates an audio call or a data call, the mobile audio-dedicated terminal 300 performs a corresponding call setup process (S108).

In this manner, the mobile audio-dedicated terminal 300 performs an audio call setup process in response to a video call setup message, and it is possible for the mobile video telephony terminal 100 to avoid unnecessarily retrying the video call.

Figure 7:
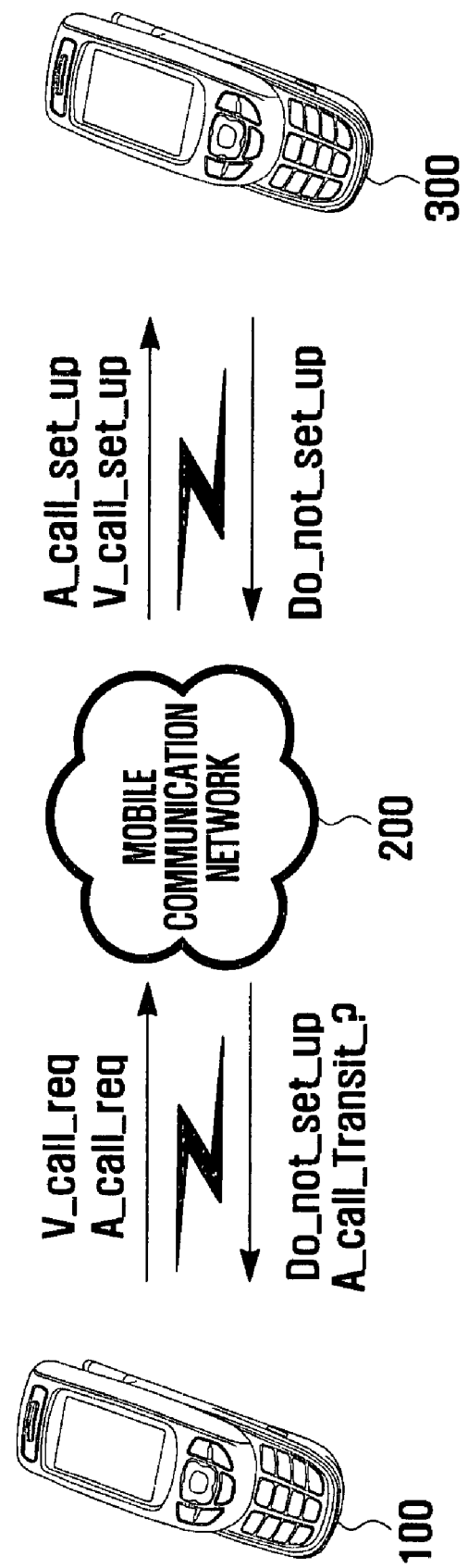
FIG. 7 is a schematic diagram illustrating a call control system according to another exemplary embodiment of the present invention.

FIG. 7 is a schematic diagram illustrating a call control system according to another exemplary embodiment of the present invention.

Referring to FIG. 7, the call control system includes the mobile video telephony terminal 100 supporting audiovisual communication and a voice communication, the mobile audio-dedicated terminal 300, and the mobile communication network 200 for providing the mobile audiovisual and voice telephony services.

The mobile video telephony terminal 100 transmits a video call request message (V_call_req) to the mobile communication network 200 together with a phone number of the mobile audio-dedicated terminal 300. In response to the V_call_req message, the mobile communication network 200 transmits a video call setup message (V_call_set_up) to the mobile audio-dedicated terminal 300. Upon receiving the V_call_set_up message, the mobile audio-dedicated terminal 300 transmits an audiovisual communication incapability message (Do_not_set_up) to the mobile video telephony terminal 100 through the mobile communication network 200 in response to the V_call_set_up message. Upon receiving the Do_not_set_up, the mobile video telephony terminal 100 transmits an audio call request message (A_call_req) to the mobile communication network 200, and the mobile communication network 200 generates and transmits an audio call setup message (A_call_set_up) to the mobile audio-dedicated terminal 300 in response to the A_call_req message. Accordingly, a voice communication link is established between the mobile video telephony terminal 100 and the mobile audio-dedicated terminal 300.

The mobile video telephony terminal 100 can be configured to automatically transmit the A_call_req message when the Do_not_set_up message is received from the mobile audio-dedicated terminal 300. The mobile video telephony terminal 100 can be configured to transmit the A_call_req message when a voice communication transit request message (A_call_Transit_?) is received from the mobile communication network 200. In this case, the mobile communication network 200 checks a type of the mobile audio-dedicated terminal 300 from information stored in a Home Location Register on the mobile audio-dedicated terminal 300, and transmits the A_call_Transit_? message when it is determined that the mobile audio-dedicated terminal 300 has no audiovisual communication capacity on the basis of the type information.

Figure 8:
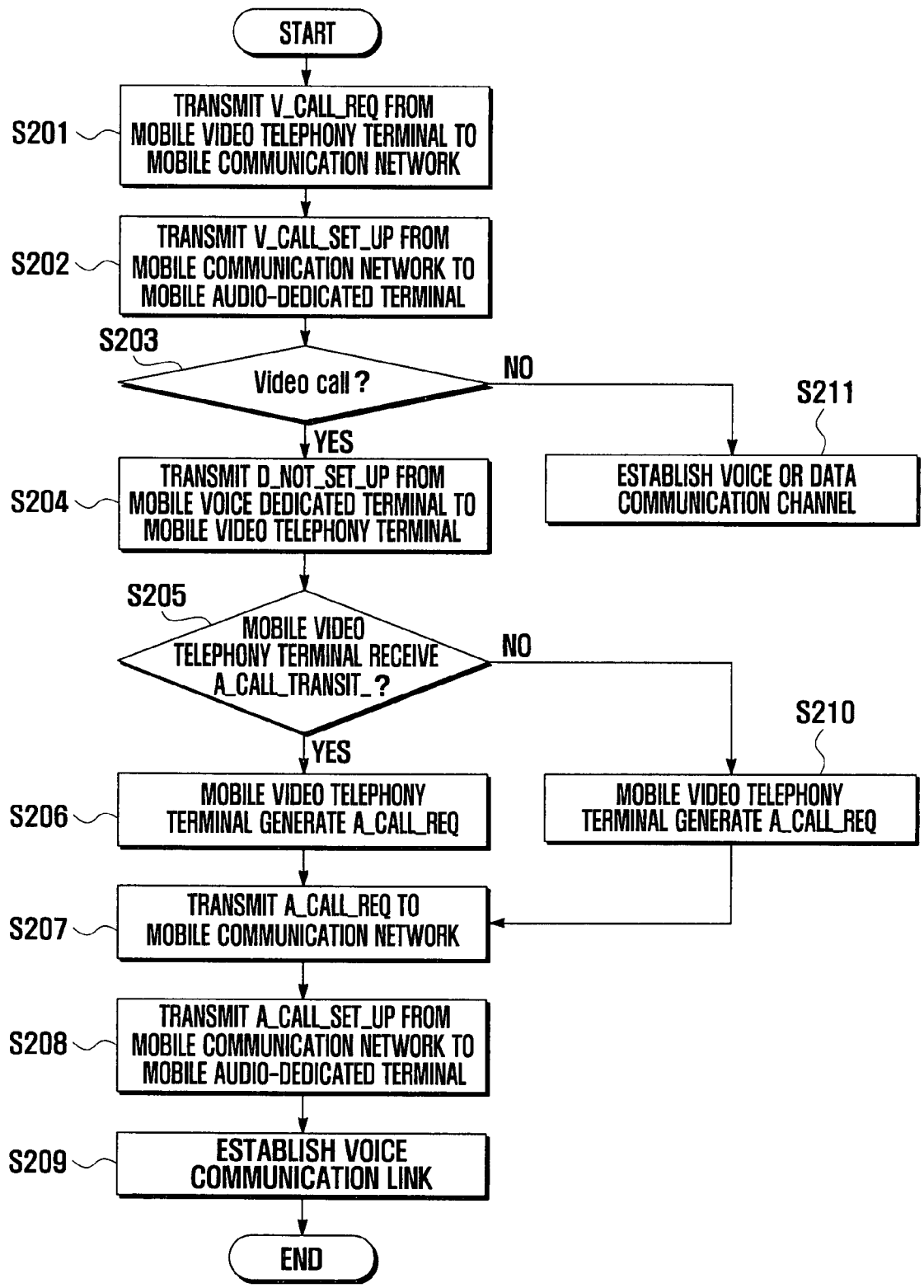
FIG. 8 is a flowchart illustrating a call control method for mobile video telephony according to another exemplary embodiment of the present invention.

FIG. 8 is a flowchart illustrating a call control method for mobile video telephony according to another exemplary embodiment of the present invention, and FIG. 9 is a message flow diagram illustrating message flows in a call control system in association with the call control method of FIG. 8.

Since the mobile video telephony terminal 100 and the mobile audio-dedicated terminal 300 have identical structures and functions to those in FIGS. 2 and 3, the call control method is described with the references used in FIGS. 5 and 6.

Referring to FIGS. 8 and 9, in the call control method according to this exemplary embodiment of the present invention, the mobile video telephony terminal 100 transmits video call request message (V_call_req) to the mobile communication network 200 (S201). Upon receiving the V_call_req message, the mobile communication network 200 generates and transmits a video call setup message (V_call_set_up) to the mobile audio-dedicated terminal 300 (S202).

The V_call_set_up message includes information on a call type, a calling party phone number for the mobile video telephony terminal 100 and a called party phone number for the mobile audio-dedicated terminal 300.

When the V_call_set_up message is received, the mobile audio-dedicated terminal 300 checks the V_call_set_up message to determine whether the call setup request for an audiovisual communication.

The V_call_set_up message includes a Calling Party BCD Number field indicating a calling party phone number and an information Transfer Capability filed indicating a call type such the mobile audio-dedicated terminal 300 can recognize the requested call type and the calling party number of the mobile video telephony terminal 100. The call type can be one of an audio call, a data call, and a video call.

If the V_call_set_up message includes a video call identifier, the mobile audio-dedicated terminal 300 generates and transmits an audiovisual communication incapacity message (Do_not_set_up) to the mobile video telephony terminal 100 through the mobile communication network 200 in response to the V_call_set_up message (S204).

After receiving the Do_not_set_up message, the mobile video telephony terminal 100 determines whether an audio call transit request message (A_call_Transit_?) is received from the mobile communication network (205).

The A_call_Transit_? is transmitted when the mobile video telephony terminal 100 registers an option for notifying a counterparty capacity to the mobile communication network 200 as a supplementary function. In the case that the counterparty capacity notification option is registered, the mobile communication network 200 obtains information on the capability of the called party terminal (in this embodiment, the mobile audio-dedicated terminal 300) from a Home Location Register (HLR) and transmits the A_call_Transit_? message to calling party terminal (in this embodiment, the mobile video telephony terminal 100) if the called party terminal does not support the audiovisual communication. The counterparty capability notification option can be disabled.

If the A_call_Transmit_? message is received from the mobile communication network 200, the mobile video telephony terminal 100 displays an announcement message on a display screen in the form of a popup window to enable a user to decide whether to change the call type.

In accordance with a command for changing the call type in put by the user, the mobile video telephony terminal 100 generates an audio call request message (A_call_req) (S206) and transmits the A_call_req message to the mobile communication network 200 (S207). In response to the A_call_req message, the mobile communication network 200 generates and transmits an audio call setup message (A_call_set_up) to the mobile audio-dedicated terminal 300 (S208). With the acceptance of voice communication by the mobile audio-dedicated terminal 300, a voice communication link is established between the mobile video telephony terminal 100 and the mobile audio-dedicated terminal 300 (S209).

At step S205, if the A_call_Transit_? message is not received within a predetermined time duration, the mobile video telephony terminal 100 automatically generates the A_call_req (S210) and then transmits the A_call_req to the mobile communication network (S207).

At step S203, if the call setup request is not for an audiovisual communication, the mobile-voice dedicated terminal 300 performs a process for establishing a voice or data communication link (S211).

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims.

As described above, the call control system and method for a mobile communication according to the present invention enable a calling party video telephony terminal to recognize a capacity of a called party terminal, thereby avoiding unnecessary video call setup attempts.

Also, the call control system and method of the present invention establish a communication link between two terminals in consideration of capabilities of the two terminals such that the terminals having different capabilities can communicate with each other, resulting in improvement of call setup reliability.

What is claimed is:

1. A call control method for establishing communication between mobile terminals having different capabilities, comprising the steps of:
   receiving, at a called party terminal, a call setup message;
   transmitting a disconnection message to a calling party terminal in response to the call setup message; and
   performing a call setup procedure triggered by the called party terminal.

2. The call control method of claim 1, wherein the step of transmitting a disconnection message comprises the step of:
generating the disconnection message if the call setup message includes a video call identifier.

3. The call control method of claim 1, wherein performing a call setup procedure comprises the steps of:
extracting a phone number of the calling party terminal from the call setup message;
generating an audio call request message with the phone number of the calling party terminal; and
transmitting the audio call request message to the calling party terminal.

4. The call control method of claim 1, further comprising the step of:
displaying an announcement message indicating that an unavailable call is received.

5. The call control method of claim 4, wherein the announcement message is a missed call alert message.

6. The call control method of claim 1, wherein the call setup message includes a call type identifier for indicating one of an audio call, a data call, and a video call.

7. A call control method for a mobile communication system including a video telephony terminal, an audio-dedicated terminal, and a mobile communication network supporting communication between the terminals, comprising:
transmitting, at the video telephony terminal, a video call request message to the mobile communication network;
transmitting, at the mobile communication network, a video call setup message to the audio-dedicated terminal in response to the video call request message;
transmitting, at the audio-dedicated terminal, a disconnection message to the video telephony terminal through the mobile communication network in response to the video call setup message; and
transmitting, at the audio-dedicated terminal, an audio call request message to the mobile communication network.

8. The call control method of claim 7, wherein transmitting a disconnection message comprises the steps of:
generating the disconnection message if the video call setup message includes a video call identifier.

9. The call control method of claim 7, wherein transmitting an audio call request message comprises the steps of:
extracting a phone number of the video telephony terminal from the video call setup message;
generating the audio call request message with the extracted phone number; and
transmitting, at the mobile communication network, an audio call setup message to the video telephony terminal in response to the audio call request message received from the audio-dedicated terminal.

10. The call control method of claim 7, further comprising the step of:
displaying an announcement message indicating that an unavailable call is received on a display screen when the disconnection message is transmitted.

11. The call control method of claim 7, further comprising the step of:
displaying a missed call alert message on a display screen when the disconnection message is transmitted.

12. The call control method of claim 7, wherein the video call setup message includes a call type identifier for indicating one of an audio call, a data call, and a video call.

13. A mobile terminal, comprising:
a radio frequency unit for receiving a video call setup message, transmitting a disconnection message in response to the video call setup message, and transmitting an audio call request message to a calling party terminal;
an audio processing unit for processing an audio signal generated during a communication session; and
a control unit for controlling automatic transmission of the disconnection message and the audio call request message.

14. The terminal of claim 13, further comprising a display unit for displaying a missed call alert message in response to the transmission of the disconnection message.

15. A call control system, comprising:
a video telephony terminal which transmits a video call request message;
an audio-dedicated terminal which transmits a disconnection message to the video telephony terminal in response to the video call request message; and
a mobile communication network for supporting communication between the video telephony terminal and the audio-dedicated terminal.

16. The call control system of claim 15, wherein the video telephony terminal comprises:
a camera for generating a video stream for an audiovisual communication;
an audio processing unit for processing an audio signal associated with the audiovisual communication;
a radio frequency unit for transmitting an audio call setup message to the audio-dedicated terminal, and establishing a communication channel with the audio-dedicated terminal;
a keypad unit for generating key input signals for executing an operation of the camera and audiovisual communication; and
a control unit for controlling cooperative signaling among the camera, audio processing unit, RF unit, and keypad unit, and controlling establishment of audiovisual communication and voice communication links.

17. The call control system of claim 16, wherein the video telephony terminal further comprises:
a display unit.

18. The call control system of claim 15, wherein the audio-dedicated terminal comprises:
a radio frequency unit for receiving a video call setup message from the video telephony terminal, transmitting a disconnection message in response to the video call setup message, and transmitting an audio call request message to the video telephony terminal;
an audio processing unit for processing an audio signal in association with a voice communication; and
a control unit for controlling transmission of the disconnection message and the audio call request message.

19. The call control system of claim 18, wherein the audio-dedicated terminal further comprises:
a display unit.

20. The call control system of claim 18, wherein the control unit controls extraction of a phone number of the video telephony terminal from the video call setup message and transmitting the audio call request with the extracted phone number.

21. A call control method for a mobile terminal, comprising the steps of:
transmitting a video call request message;
receiving an audiovisual communication unavailable message in response to the video call request message; and
transmitting an audio call request message in response to the audiovisual communication unavailable message.

22. The call control method of claim 21, further comprising the step of:
  receiving an audio call transmit message after receiving the audiovisual communication unavailable message.

23. The call control method of claim 21, further comprising the step of:
  providing a plurality of mobile terminals, including a video telephone terminal and an audio-dedicated terminal;
  transmitting, at the video telephony terminal, the video call request message to a mobile communication network;
  transmitting, at the mobile communication network, a video call setup message to the audio-dedicated terminal in response to the video call request message;
  transmitting, at the audio-dedicated terminal, a disconnection message to the video telephony terminal through the mobile communication network in response to the video call setup message;
  transmitting, at the video telephony terminal, an audio call request message to the mobile communication network; and
  transmitting, at the mobile communication network, an audio call setup message to the audio-dedicated terminal in response to the audio call request message.

24. The call control method of claim 23, further comprising the step of:
  transmitting, at the mobile communication network, an audio call transit message to the video telephony terminal in response to receiving the disconnection message from the audio-dedicated terminal.

25. The call control method of claim 24, wherein transmitting an audio call transit message comprises the step of:
  checking a type of the audio-dedicated terminal; and
  generating the audio call transit message if the type of the audio-dedicated terminal is an audio-dedicated type.

* * * * *